United States Patent [19]

Bijl

[11] E Patent Number: Re. 33,598

[45] Reissued Date of Patent: May 28, 1991

[54] FACING CUTTER

[75] Inventor: Roy Bijl, Waalre, Netherlands

[73] Assignee: Walker-Hagou B.V., Bladel, Netherlands

[21] Appl. No.: 501,605

[22] Filed: Mar. 23, 1990

Related U.S. Patent Documents

Reissue of:

[64] Patent No.: 4,758,120
Issued: Jul. 19, 1988
Appl. No.: 3,576
Filed: Jan. 15, 1987

[30] Foreign Application Priority Data

Jan. 16, 1986 [EP] European Pat. Off. ..... 86200073.4

[51] Int. Cl.[5] ..... B23B 41/02; B23B 51/00

[52] U.S. Cl. ..... 408/204; 408/206; 408/207; 408/703

[58] Field of Search ..... 408/204, 206, 207, 224, 408/703

[56] References Cited

U.S. PATENT DOCUMENTS

| | | | |
|---|---|---|---|
| 313,405 | 3/1885 | Davis | 408/207 |
| 3,244,035 | 4/1966 | Jehle et al. | 408/204 |
| 3,548,687 | 12/1970 | Holloway | 408/204 |
| 3,765,789 | 10/1973 | Hougen | 408/204 |
| 4,408,935 | 10/1983 | Miyanaga | 408/206 |
| 4,586,857 | 5/1986 | Ohmi | 408/206 |
| 4,632,610 | 12/1986 | Hougen | 408/204 |
| 4,767,245 | 8/1988 | Shoji et al. | 408/204 |

FOREIGN PATENT DOCUMENTS

| | | | |
|---|---|---|---|
| 64213 | 3/1982 | Japan | 408/204 |
| 211408 | 12/1982 | Japan | 408/204 |
| 2080162 | 3/1982 | United Kingdom . | |
| 2100151 | 12/1982 | United Kingdom | 408/204 |
| 2167983 | 6/1986 | United Kingdom | 408/204 |

*Primary Examiner*—Daniel W. Howell
*Attorney, Agent, or Firm*—Lorusso & Loud

[57] ABSTRACT

A facing cutter for making annular holes which includes a substantially cylindrical jacket having inner and outer peripheries and a lower end. A plurality of axial teeth are spaced circumferentially at the lower end of the jacket with each tooth having an inner and outer cutting edge which extends helically along the jacket. The teeth are of alternately different design, with a different angle formed by the intersection of the inner and outer cutting edges on every other tooth and the axial length of the alternate teeth being different. An initial tooth cuts the central portion of a groove to be formed to a deeper level than an alternate tooth that cuts the side portions of the groove to be formed.

6 Claims, 1 Drawing Sheet

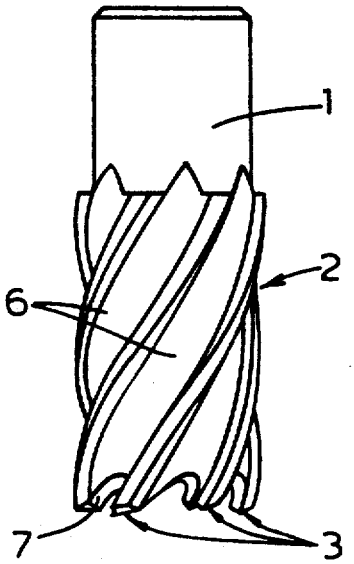
fig.1
fig.2
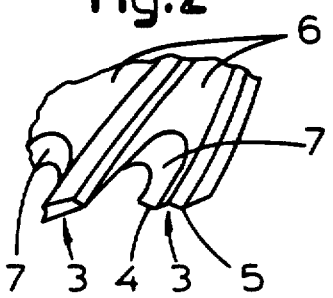
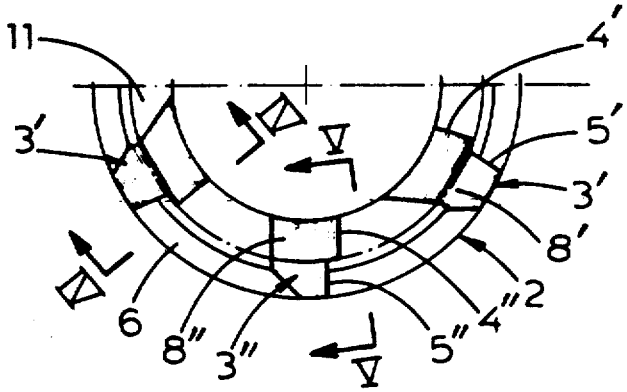
fig.3
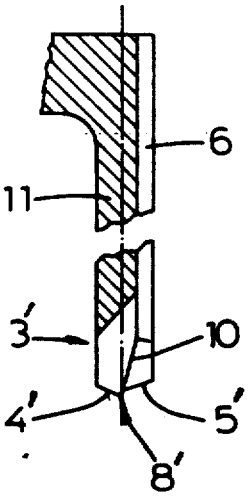
fig.4
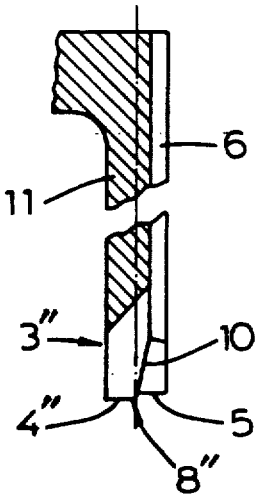
fig.5
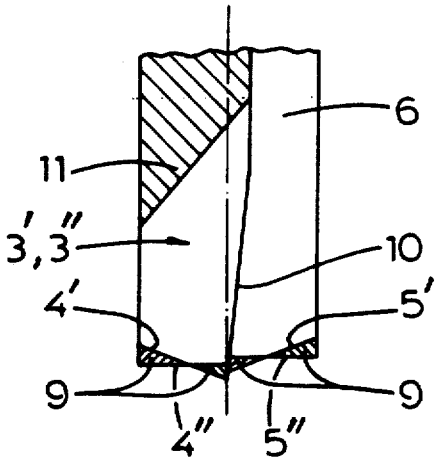
fig.6

FACING CUTTER

Matter enclosed in heavy brackets [ ] appears in the original patent but forms no part of this reissue specification; matter printed in italics indicates the additions made by reissue.

FIELD OF THE INVENTION

The invention relates to a facing cutter for making annular holes. More particularly the invention relates to a facing cutter comprising a substantially cylindrical jacket having inner and outer peripheries and a lower end; and a plurality of axial teeth spaced circumferentially at the lower end of said jacket, each cutting tooth having an inner cutting edge extending outwardly from the inner periphery of the jacket and an adjacent outer cutting edge extending inwardly from the outer periphery of the jacket. Successive teeth are of alternately different construction, wherein the angle between the inner cutting edge and the outer cutting edge, respectively, and a radial transverse plane of the cutter is different for adjacent cutting teeth. The axial length for adjacent teeth is also different, such that from the groove to be formed with two adjacent tooth one tooth is adapted to cut the central portion of said groove, while the other tooth is adapted to cut the side portions of the groove.

DESCRIPTION OF THE RELATED ART

In the art many types of facing cutters for making annular holes are known. For instance there is known a facing cutter or annular hole cutter comprising a cylindrical jacket having a plurality of axial teeth spaced circumferentially at the lower end thereof. Each tooth has an inner cutting edge and an adjoining outer cutting edge. At their joint the inner and outer cutting edges are offset circumferentially. Furthermore successive teeth are of alternately different construction. Herein the cutting edges have such configuration, that with two adjacent teeth four different chips are being cut, each chip having a width which is only a part of the width of the respective cutting edge. Consequently rather slender chips are obtained, which enables a smooth discharge of the chips through the adjacent gullet. In order to achieve such slender chips the back off faces of the teeth are relieved. Herein at least one of the cutting edges of each tooth has an axial crest extending substantially in circumferential direction. With two adjacent teeth the crests in the respective cutting edges are offset in transverse direction with respect to each other thereby.

As a consequence of the crest like configuration of the inner and outer cutting edges the material cut by these is not only elongated plastically in circumferential direction but also in transverse direction. This results in a tendency of the chip parts cut at both sides of the crest to slide towards one another. Since there is no room available for such displacement an additional deformation of the chips occurs, which results in an unevitable and undesired energy dissipation.

SUMMARY OF THE INVENTION

It is one object of the present invention to provide a cutter, wherein the above mentioned disadvantages are removed in an effective way.

Another object of the invention is to provide a cutter, which produces a very favorable chip geometry.

Still another object of the invention is to provide a cutter cutting four different slender chips at two adjacent teeth by means of a very simple tooth configuration.

A further object of the invention is to provide a low cost cutter having superior cutting capabilities.

Yet a further object of the invention is to provide a cutter having a low energy dissipation at each tooth during cutting.

Yet a further object of the invention is to provide a cutter, wherein the unobstructed ejection of chips from the cutting zones of the teeth is promoted.

These aforementioned objects are achieved by the facing cutter for making annular holes according to the invention. Herein both inner and outer cutting edges of each tooth are uninterrupted, that is the derivative of a line or curve through the inner and outer cutting edges, respectively is continuous. Since only a few grinding operations for each tooth are necessary the cutter is easy to manufacture with low costs, yet without impeding the superior cutting capabilities. Successive teeth are of alternately different construction, wherein preferably with two adjacent teeth the clearance face of one tooth is roof-shaped and the other one has a flat configuration. Furthermore the flat teeth terminates shorter in axial direction such that of the groove to be formed by the cutting teeth the roof-shaped teeth are adapted to cut the central portion of said groove, while the flat teeth cut the side portions of the groove.

Of course the flat configuration of the alternate teeth further simplifies the manufacturing of the cutter, thereby further reducing the costs thereof.

Also as a consequence of the flat configuration of the alternate teeth, wherein the cutting edges extend substantially perpendicular to the longitudinal center line of the jacket, the material cut by the cutting edges of the flat teeth is only subjected to a plastic elongation in circumferential direction of the cutter and not to a plastic elongation in transverse radial direction, which would occur with a cutting edge having an axial crest in the cutting edges. With the roof-shaped teeth of the cutter according to the invention the additional chip deformation of the chips at the crest between both cutting edges which would result in an undesired energy dissipation is avoided by the offset of the inner and outer cutting edges with respect to one another. Said offset causes an axial separation of the respective chip, whereby the chips are able to slide one on top of the other during cutting thereby preventing the additional deformation. Moreover the chip cut by the outer cutting edge immediately abuts the shoulder of the offset inner cutting edge, whereby it starts to rotate and leaves in the direction of the gullet parallel to and with the same velocity as the chip at the inner cutting edge. As a result thereof the discharge of the chip is promoted.

According to the invention in the cutting teeth adapted to cut the central portion of the groove to be formed the outer end of the inner cutting edge is offset with respect to the inner end of the outer cutting edge. It is also possible that with all cutting teeth the outer end of the inner cutting edge is offset with respect to the inner end of the outer cutting edge. As a consequence of the offset of the cutting edges on the cutting teeth which remove material from the side portions of the groove, it is made possible to obtain four chips of substantially equal size, so that a very favorable chip geometry is achieved in that the four chip have a small chip slenderness, whereby at equal feed per revolution a lower specific cutting energy is needed compared with known cutters. As a result thereof it is possible to cut a hole at the same speed with less power supplied to the cutting device. Further it will cause a decrease in heat production resulting in a longer operational life of the cutter due to retarded material deterioration and reduced wear. The small width of each chip enables the gullet to be made correspondingly shallower. In this way the cutter jacket will be stronger and more rigid, whereby the vibration stability of the cutter and consequently the quality of the cutting operation will be improved.

BRIEF DESCRIPTION OF THE DRAWING

The invention will hereafter be elucidated with reference to the drawing, which shows an embodiment of the facing cutter according to the invention by way of example.

FIG. 1 is a side view of a facing cutter according to the invention.

FIG. 2 is an enlarged detail of the lower portion of the cutter of FIG. 1.

FIG. 3 is a bottom view of half of the cutter of FIG. 1 on an enlarged scale.

FIG. 4 is a section along the line IV—IV in FIG. 3.

FIG. 5 is a section along the line V—V in FIG. 3.

FIG. 6 is a schematic illustration of the way of cutting of the cutter according to the invention, wherein two adjacent cutting teeth are projected onto each other in the circumferential direction.

DESCRIPTION OF THE PREFERRED EMBODIMENT

The drawing shows a cutter for making annular holes, which is referred to as a facing cutter. This cutter is provided with a coupling portion 1 for the connection to a cutter device (not shown) and with a jacket 2. The jacket 2 is of a cylindrical hollow construction, and at the lower edge thereof a plurality of cutting teeth 3 are formed, which extend axially and which are spaced apart in the circumferential direction. Each cutting tooth 3 has an inner cutting edge 4 extending from the inner periphery of the jacket 2 and has further an associated outer cutting edge 5 extending from the outer periphery of the jacket 2.

Between any two successive cutting teeth 3 a flute 6 is formed in the wall 11 of the jacket 2 to extend helically in the axial direction, which flutes are designed to permit the passage of chips during cutting. The chips formed by the outer cutting edges 5 enter directly into these flutes 6, whilst the chips formed by the inner cutting edges 4 are led through upwardly and outwardly inclined gullets 7 to the respective flutes 6.

As can be seen from FIGS. 3 to 6, the successive cutting teeth 3 are of alternately different construction, in such way that adjacent cutting teeth 3 have a different configuration. In the embodiment shown by way of example the cutting teeth 3' according to FIG. 4 have a roof-shaped clearance face 8', and the clearance face 8'' of the cutting teeth 3'' according to FIG. 5 has a flat configuration.

The cutting teeth 3' and the cutting teeth 3'' extend in the axial direction to such extent with respect to each other that the radially central portion of each roof-shaped cutting tooth 3' projects beyond the central portion of each flat cutting tooth 3'', whilst the radially inner and outer portions of each roof-shaped cutting tooth 3' projects less in the axial direction than the radially inner and outer portions of each cutting tooth 3''. This can be clearly seen from FIG. 6. This feature results in that the roof-shaped cutting teeth 3' cut the central portion of the groove to be formed, whilst the side portions of the groove to be formed are cut by the flat cutting teeth 3''.

FIGS. 2 and 3 show that the outer end of the inner cutting edge 4'', 4'' of each cutting tooth 3', 3'' is offset forwardly in the direction of rotation of the cutter with respect to the inner end of the outer cutting edge 5', 5'' of the respective cutting tooth 3', 3''. This is a result of the fact that the inner cutting edge 4', 4'' of each cutting tooth 3', 3'' as viewed in the direction or rotation of the cutter lies further forwardly than the outer cutting edge of the same cutting tooth 3', 3'', so that the clearance face 8', 8'' of each cutting tooth 3', 3'' extends further forwardly at the inner cutting edge 4', 4'' than at the outer cutting edge 5', 5''.

Since the clearance angle of the clearance face 8', 8'' of each cutting tooth 3', 3'' has a positive value, the fact that the clearance face 8', 8'' extends further forwardly at the inner cutting edge 4', 4'' results in that this inner cutting edge cuts deeper in the axial direction of the cutter than the outer cutting edge 5', 5'' of the same cutting tooth 3', 3''.

In FIGS. 4 and 5 the cutting teeth 3', 3'' respectively are shown in a circumferential view, wherein it can be clearly seen that the outer end of the inner cutting edge 4', 4'' is offset downwardly with respect to the inner end of the outer cutting edge 5', 5''. The offset between the inner cutting edge 4' and the outer cutting edge 5' of each roof-shaped cutting tooth 3' causes the central part of the groove cut in the material by this cutting tooth to be separated into two single chips 9, so that at two adjacent teeth totally four different chips 9 are formed.

As FIG. 6 illustrates, the offset of the inner cutting edge 4'' with respect to the outer cutting edge 5'' of the flat cutting tooth 3'' results in that the four chips 9 formed by two adjacent cutting teeth 3' and 3'' are substantially of equal size. Hereby the four chips have a small chip width, so that the flutes 6 can be constructed radially narrower, i.e. shallower from the outer cutting edges 5 on through an inclined edge 10. The wall 11 of the jacket 2 at the location of the flutes 6 can thereby be made correspondingly thicker, which has a positive influence on the vibration stability of the cutter and thereby on the quality of the cutting operation.

The invention is not restricted to the embodiment shown in the drawing by way of example, which can be varied in different ways within the scope of the invention.

I claim:

1. A facing cutter for making annular holes, comprising:

a substantially cylindrical jacket having inner and outer peripheries and a lower end;

a plurality of axial cutting teeth spaced circumferentially at the lower end of said jacket;

each of said cutting teeth having two cutting edges, a radially inner cutting edge and a radially outer cutting edge;

said inner cutting edge extending radially outward from the inner periphery of the jacket;

said outer cutting edge extending radially inward from the outer periphery of the jacket;

the radially outer end of said inner cutting edge being offset circumferentially with respect to the radially inner end of said outer cutting edge;

every other tooth around the circumference of the periphery being of alternately different clearance face configuration, wherein one tooth has a roof-shaped clearance face configuration, the roof-shaped tooth having a crest at the joint between the the inner and outer cutting edges, the next tooth having a flat clearance face configuration;

the axial length for every other tooth being also of alternately different configuration such that the cutting teeth having the roof-shaped clearance face are adapted to cut the central portion of the groove to be formed by the cutting teeth, while the cutting teeth having the flat clearance face are adapted to cut the side portions of the groove to be formed.

2. A facing cutter as claimed in claim 1, wherein the outer end of the inner cutting edge is offset axially with respect to the inner end of the outer cutting edge when viewed in the circumferential direction of the cutter.

3. A facing cutter as claimed in claim 1, wherein the outer end of the inner cutting edge is offset forwardly in the direction of rotation of the cutter with respect to the inner end of the outer cutting edge.

*4. A facing cutter for making annular holes, comprising:*

*a substantially cylindrical jacket having inner and outer peripheries and a lower end;*

*a plurality of axial cutting teeth spaced circumferentially at the lower end of said jacket;*

*each of said cutting teeth having two cutting edges, a radially inner cutting edge and a radially outer cutting edge;*

*said inner cutting edge extending radially outward from the inner periphery of the jacket;*

*said outer cutting edge extending radially inward from the outer periphery of the jacket;*

*every other tooth around the circumference of the periphery being of alternately different clearance face configuration, wherein one tooth has a roof-shaped clearance face configuration, the roof-shaped tooth having a crest at the joint between the inner and outer cutting edges, the next tooth having a flat clearance face configuration;*

*the radially outer end of said inner cutting edge of each of said roof-shaped teeth being offset circumferentially with respect to the radially inner end of said outer cutting edge;*

*the axial length for every other tooth being also of alternately different configuration such that the cutting teeth having the roof-shaped clearance face are adapted to cut the central portion of the groove to be formed by the cutting teeth, while the cutting teeth having the flat clearance face are adapted to cut the side portions of the groove to be formed.*

*5. A facing cutter as claimed in claim 4, wherein with all cutting teeth the outer end of the inner cutting edge is offset with respect to the inner end of the outer cutting edge.*

*6. A facing cutter as claimed in claim 4, wherein the outer end of the inner cutting edge is offset forwardly in the direction of rotation of the cutter with respect to the inner end of the outer cutting edge.*

* * * * *